United States Patent [19]

Hughes

[11] 3,722,569

[45] Mar. 27, 1973

[54] INNER TUBE SEALING MEANS

[76] Inventor: George W. Hughes, 3405 Ennis, Houston, Tex.

[22] Filed: Mar. 11, 1971

[21] Appl. No.: 123,247

[52] U.S. Cl. ................................................152/429
[51] Int. Cl. ..............................................B60c 29/00
[58] Field of Search...............................152/429, 427

[56] References Cited

UNITED STATES PATENTS 3,542,110  11/1970  Holl......................................152/429

*Primary Examiner*—James B. Marbert
*Attorney*—Ranseler O. Wyatt

[57] ABSTRACT

A means for sealing the air within a tire casing and locking the valve stem in position on the rim so that air escaping from the inner tube will not leak from the casing.

3 Claims, 1 Drawing Figure

PATENTED MAR 27 1973 3,722,569
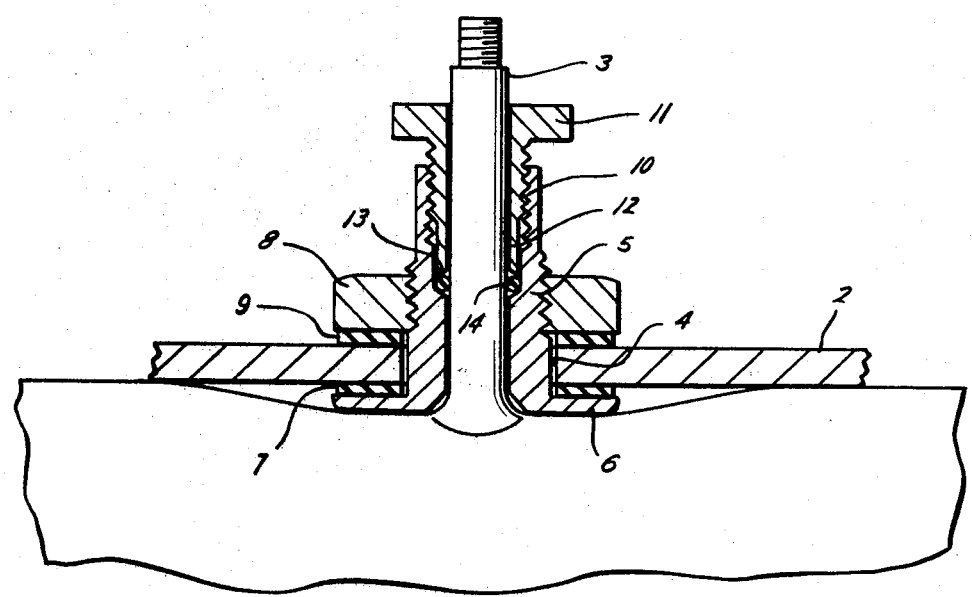
George W. Hughes
INVENTOR.
BY Pamela O Wyatt
ATTORNEY

INNER TUBE SEALING MEANS

BACKGROUND OF THE INVENTION

This application is a supplemental application, in continuance of the application for patent on an automobile tire valve adapter filed in the United States Patent Office on July 2, 1969, Ser. No. 838,576 now U.S. Pat. No. 3,637,002.

BRIEF DESCRIPTION OF THE DRAWINGS

The FIGURE shows a slide elevational, cross sectional view of the locking means, showing a tube mounted on a rim and the valve stem thereof extending upwardly through said locking means.

DESCRIPTION OF THE PREFERRED EMBODIMENT

In the drawings, the usual inner tube 1 is shown mounted in a casing (not shown) which is mounted on the rim 2 in the usual manner, and the valve stem 3 is inserted through the valve stem opening 4 in the rim 2. The stem 3 passes through the outer housing 5 of the sealing member, which has the outwardly extending flange 6 on one end, which bears against the washer 7 and seals the inner surface of the rim 2. The lock nut 8 mounted on the externally threaded portion of the housing 5 may be moved into position to bear against the washer 9 which bears against the outer surface of the rim 2. The opposite end of the outer housing 5 has the enlarged, coaxial and internally threaded passageway 10 which receives the jam nut 11, and the nut 11 has the externally reduced area 12, which terminates in the end face 13 which bears against the flexible O-ring 14.

In mounting the device, the inner tube is placed in the casing (not shown) and the tire mounted in the usual manner. Prior to mounting the tire on the rim 2, the outer housing 5 is inserted through the valve passageway 4 in the rim, and the lock nut 8 is tightened to securely mount the outer housing 5 in place. The tire is then mounted on the wheel, and the valve stem 3 inserted through the axial passageway in the outer housing 5, and the jam nut 11 is mounted in the outer housing 5 and tightened against the flexible O-ring 14 which will expand inwardly against the valve stem 3.

In the event of a leak in the tube 1, the rim opening 4 being sealed and the outside of the stem 3 being sealed, no air can escape from the casing, thus preventing complete deflation of the tire. Further the inner tube is locked to the rim and is not readily removed therefrom.

What I claim is:

1. In an inner tube sealing means, an outer housing mounted in sealing relation in the valve stem passageway of a wheel rim, an axial passageway in said housing adapted to receive the valve stem of an inner tube, a jam nut mounted in said outer housing and movable into sealing relation with said valve stem.

2. The device defined in claim 1 wherein said outer housing has an axial chamber, an internal shoulder formed therein and a flexible ring on said shoulder adapted to be contacted by said jam nut and expanded against said valve stem.

3. The device defined in claim 1 wherein said housing has an internally threaded area adapted to receive said jam nut when said valve stem is mounted therein.

* * * * *